United States Patent [19]

Kobayashi et al.

[11] Patent Number: 4,503,822
[45] Date of Patent: Mar. 12, 1985

[54] ELECTRONIC ENGINE CONTROL SYSTEM

[75] Inventors: Nobuyuki Kobayashi, Toyota; Hiroshi Ito, Nagoya, both of Japan

[73] Assignee: Toyota Jidosha Kabushiki Kaisha, Toyota, Japan

[21] Appl. No.: 616,778

[22] Filed: Jun. 1, 1984

Related U.S. Application Data

[63] Continuation of Ser. No. 407,557, Aug. 12, 1982, abandoned.

[30] Foreign Application Priority Data

Aug. 13, 1981 [JP] Japan .................................. 56-126881
Aug. 13, 1981 [JP] Japan .................................. 56-126885

[51] Int. Cl.³ .......................... F02B 3/00; F02P 5/06; F02P 5/14
[52] U.S. Cl. ................................. 123/416; 123/417; 123/493
[58] Field of Search ............... 123/417, 416, 423, 425, 123/325, 329, 493, 422, 480, 320

[56] References Cited

U.S. PATENT DOCUMENTS

| 3,587,764 | 6/1971 | Bowles | 123/423 |
| 4,204,483 | 5/1980 | Harada et al. | 123/493 |
| 4,225,925 | 9/1980 | Hattori et al. | 123/416 |
| 4,258,683 | 3/1981 | HAttori et al. | 123/416 |
| 4,259,723 | 3/1981 | Fujisawa et al. | 123/493 |
| 4,262,644 | 4/1981 | Walker et al. | 123/416 |
| 4,373,489 | 2/1983 | Yamaguchi | 123/417 |

Primary Examiner—Raymond A. Nelli
Attorney, Agent, or Firm—Cushman, Darby & Cushman

[57] ABSTRACT

An ignition timing controlling system of an engine for controlling a fuel injection flow rate and the ignition timing on the basis of intake air flow rate and an engine rotational speed. The system controls the ignition timing to the maximum ignition advance angle when a throttle valve is fully closed and the fuel injection is stopped as in the course of deceleration, or the throttle valve is fully closed and the fuel injection is stopped after a predetermined times of ignition have been effected, and controls the ignition timing to the optimum ignition advance angle when, thereafter, the fuel injection has returned.

14 Claims, 5 Drawing Figures

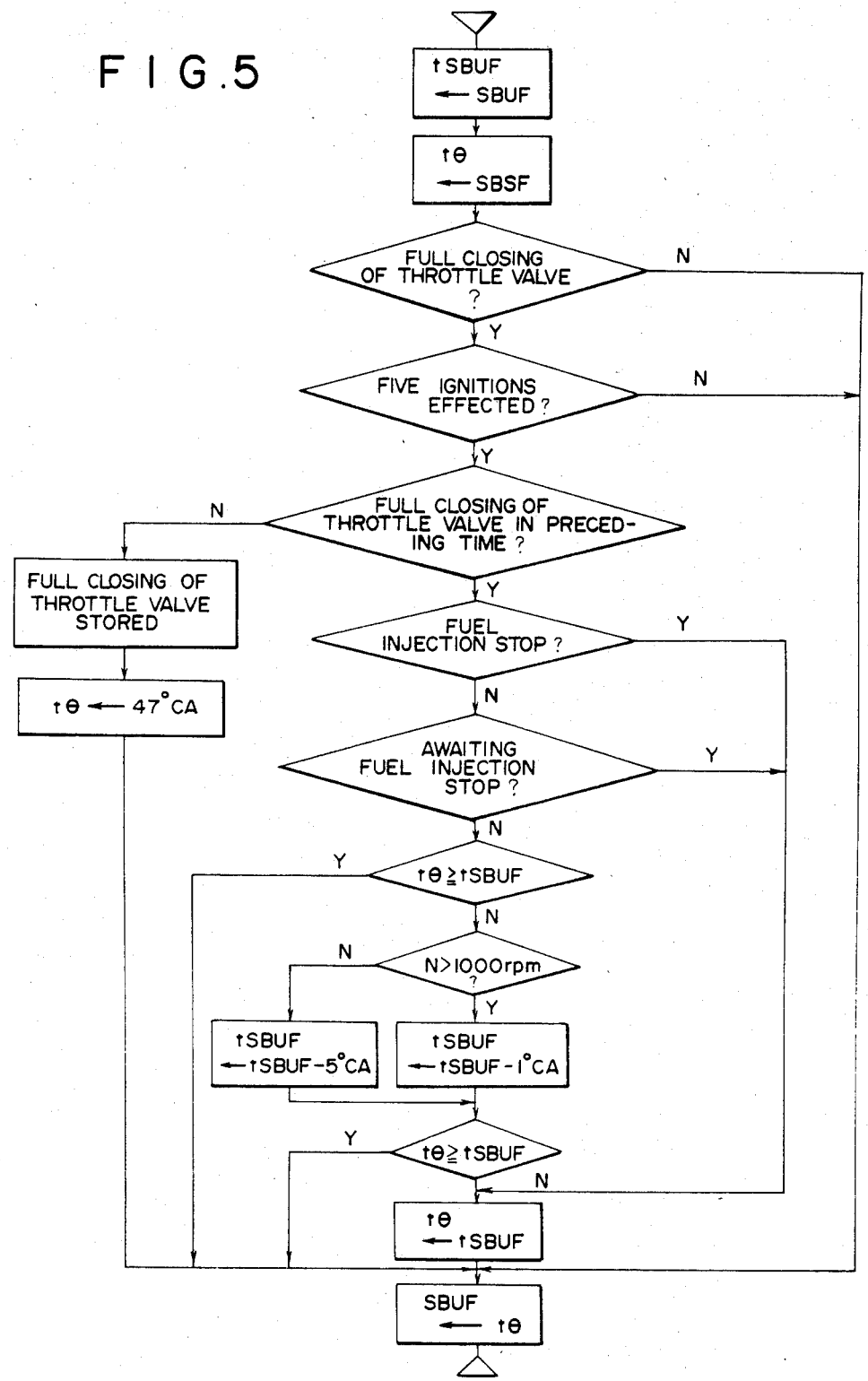

ELECTRONIC ENGINE CONTROL SYSTEM

This is a continuation of application Ser. No. 407,557 filed Aug. 12, 1982, now abandoned.

BACKGROUND OF THE INVENTION

1. Field of the Invention

This invention relates to electronic engine control systems, and more particularly to an electronic engine control system capable of controlling an ignition timing of an engine having a gasoline injection device.

2. Description of the Prior Art

Heretofore, there have been known engines each provided thereon with a fuel injection device in which a basic fuel injection flow rate is calculated from an intake air flow rate taken into the engine and a rotational speed of the engine. The basic fuel injection flow rate is then corrected in accordance with the condition of the engine in a cold state and during acceleration. A resulting fuel injection signal is fed from an electronic control circuit to a fuel injection device provided on an intake manifold, and a corresponding amount of fuel is injected. In the engine provided with the fuel injection device of the type described, when the throttle valve is fully closed and the engine value, speed exceeds a predetermined rotational i.e., engine braking is effected, fuel injection from the fuel injection device is stopped and a catalytic converter is prevented from being heated. Additionally, if fuel injection is directly stopped at the same the throttle valve becomes fully closed, a shock acts on the vehicle. Hence, a time period is provided between the full closing of the throttle valve and the fuel injection stop.

In controlling the ignition timing of the engine provided with the described fuel injection device, one of the basic ignition advance angles, determined in accordance with the engine rotational speed and the intake air flow rate, which had been previously stored in an electronic control circuit such as a microcomputer, is selected commensurate to the engine rotational speed and the intake air flow rate. A correction ignition advance angle is then determined by intake air temperature, engine coolant temperature and the like and is added to the basic ignition advance angle so as to determine the optimum ignition advance angle. An ignition signal is then fed from the electronic control circuit to an igniter, whereby a time period for current passage and the ignition timing is controlled.

However, in controlling the ignition timing of the engine provided with the conventional fuel injection device, even when fuel injection has stopped during engine breaking and during the time period for awaiting fuel injection to stop at the very beginning of engine breaking, ignition timing is controlled by the ignition advance angle determined by the intake air flow rate and the engine rotational speed which tends to lag. Consequently, if the throttle valve is abruptly closed during deceleration, then a gasified fuel-air mixture becomes over-rich upon completion of deceleration. Incomplete combustion of the gasified fuel-air mixture occurs during the combustion stroke due to the relatively retarded ignition advance angle and the slow burning rate of over-rich mixtures to cause after-burns, thereby presenting disadvantages of increased heat loss and possible engine overheating.

SUMMARY OF THE INVENTION

The present invention has been developed to obviate the above-described disadvantages of the prior art and has as its first object the provision of an electronic engine control system in which, within an after-burn occurring region (beginning immediately upon the closing of the throttle valve), the ignition timing is controlled to the maximum ignition advance angle so as to prevent (beginning immediately upon the closing of the throttle valve) after-burns from occurring.

The present invention has as its second object the engine control system, in which, when fuel injection has stopped or during the time period just before fuel injection is to stop, in the after-burn occurring region (beginning immediately upon the closing of the throttle valve), the ignition timing is controlled to the maximum ignition advance angle to prevent after-burns from occurring, and, upon return to fuel injection, the ignition timing is progressively controlled to the optimum ignition advance angle so as to prevent after-burns from occurring during deceleration.

If the ignition timing is advanced to the maximum within the after-burn occurring region as described above, then knocking may occur. In consequence, the present invention has as its third object the provision of an electronic engine control system, in which, at the time that fuel injection has stopped or during the time period just before fuel injection is to stop, after a predetermined number of ignitions have occurred upon full closing of the throttle valve, within the after-burn ocurring region (beginning immediately upon the closing of the throttle valve), the ignition timing is controlled to the maximum ignition advance angle, and, upon return to fuel injection, the ignition timing is progressively controlled to the optimum ignition advance angle, so that the after-burns can be prevented from occurring during deceleration and knockings can be precluded from occurring during transition.

To achieve the above-described objects, the present invention contemplates the control of ignition timing to the maximum ignition advance angle when the throttle valve is fully closed. According to the present invention, at the time fuel injection has stopped or during the time period just before fuel injection is to stop and when the throttle valve is fully closed, the ignition timing is adapted to be controlled to the maximum ignition advance angle. Additionally, according to the present invention, after a predetermined number of ignitions have occurred upon full closing of the throttle valve, the ignition timing is adapted to be controlled to the maximum ignition advance angle. Further, according to the present invention, at the time that fuel injection has stopped or during the time period just before fuel injection is to stop after a predetermined number of ignitions have occurred upon full closing of the throttle valve, the ignition timing is adapted to be controlled to the maximum ignition advance angle. Still further, according to the present invention, upon return to the fuel injection after the ignition timing has been controlled to the maximum ignition advance angle, the ignition timing is adapted to be progressively controlled to the optimum ignition advance angle. Yet further, to achieve the above-described objects, according to the present invention, the electronic engine control system comprises: an intake air flow rate sensor for detecting an intake air flow rate taken into the engine at the upstream side of the throttle valve and outputting an intake air flow rate signal; an engine rotation sensor for detecting a rotational speed of the engine and outputting an engine rotational speed signal; a throttle sensor for detecting the opening of the throttle valve and outputting a throttle position signal; and a control circuit, in which the ignition timing is controlled to the optimum ignition advance angle in response to the intake air flow rate signal and the engine rotational speed signal, when the fuel injection has stopped or the time period, just before the fuel injection is to stop is detected by the aforesaid throttle position signal, the ignition timing is controlled to the maximum ignition advance angle, and, upon return to fuel injection, control signals including an ignition signal is outputted which progressively controls the ignition timing to the optimum ignition advance angle. Furthermore, to achieve the above-described objects, according to the present invention, the electronic engine control system comprises: an intake air flow rate sensor for detecting an intake air flow rate taken into the engine at the upstream side of the throttle valve and outputting an intake air flow rate signal; an engine rotation sensor for detecting a rotational speed of the engine and outputting an engine rotational speed signal; a throttle sensor for detecting the opening of the throttle valve and outputting a throttle position signal; and a control circuit, in which the ignition timing is controlled to the optimum ignition advance angle in response to the intake air flow rate signal and the engine rotational speed signal, after a predetermined number of ignitions have occurred upon selection of the full closing of the throttle valve by said throttle position signal, a control signal including an ignition signal is outputted which controls the ignition timing to the maximum ignition advance angle.

As has been described hereinabove, the present invention can offer the outstanding advantages that afterburns during deceleration are prevented from occurring to eliminate increased heat loss and engine overheat, and knockings during transition can be precluded.

BRIEF DESCRIPTION OF THE DRAWINGS

FIG. 5 is a flow sheet showing a second control by the electronic control circuit in the aforesaid embodiment.

DESCRIPTION OF THE PREFERRED EMBODIMENT

Figure 1:
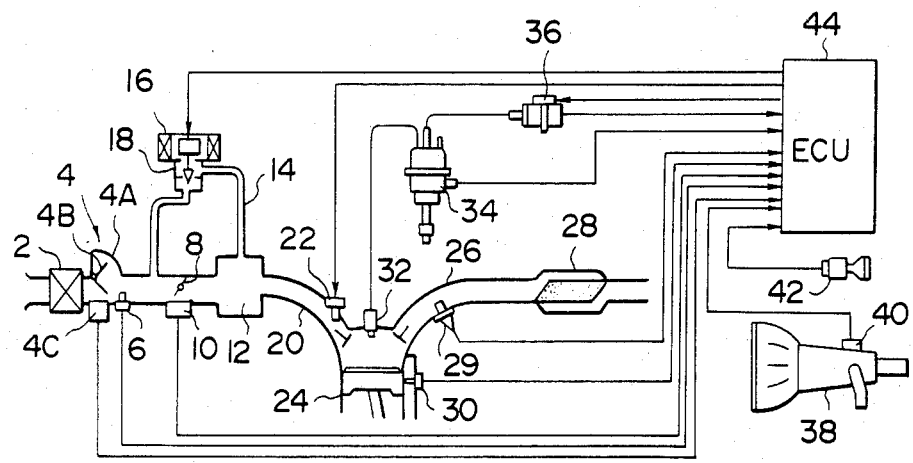
FIG. 1 is a circuit diagram showing an embodiment of the present invention.

Detailed description will hereunder be given of one embodiment of the present invention with reference to the drawings. The present embodiment is shown in FIG. 1. As shown in the drawing, the present embodiment comprises an air cleaner 2 and an air flow meter 4 functioning as an intake air flow rate sensor, provided downstream of the air cleaner. The air flow meter 4 comprises a compensation plate 4B rotatably provided in a chamber 4A and a potentiometer 4C for detecting the opening of the compensation plate 4B. In consequence, the intake air flow rate is detected as a voltage outputted from the potentiometer 4C. Provided in the vicinity of the air flow meter 4 is an intake air temperature sensor 6 for detecting the temperature of intake air.

A throttle valve 8 is disposed downstream of the air flow meter 4, and a throttle sensor 10 such as a throttle switch for detecting the opening of the throttle valve and outputting a throttle position signal is disposed in the vicinity of the throttle valve 8. Provided downstream of the throttle valve 8 is a surge tank 12, which is provided with a bypass passage 14 bypassing the throttle valve 8. This bypass passing 14 is provided thereon with an air valve 18 controlled by a step motor 16. This air valve 18 causes intake air to pass through the surge tank 12, bypassing the throttle valve 8 during idling, whereby the engine rotational speed is controlled to a target value.

Connected to the surge tank 12 is an intake manifold 20, in which is provided a fuel injection device 22 projecting thereinto. The intake manifold 20 is connected to a combustion chamber of an engine 24, and the combustion chamber of the engine is connected to a catalytic converter 28 filled up with three-way catalysts, through an exhaust manifold 26. Designated at 29 is a $O_2$ sensor for controlling the gasified fuel-air mixture to the neighborhood of the theorectical air-fuel ratio, and 30 a coolant temperature sensor for detecting the engine coolant temperature.

An ignition plug 32 of the engine 24 is connected to a distributor 34, which in turn is connected to an igniter 36. Denoted at 38 is a transmission, 40 a neutral start switch for detecting a neutral position of a shift lever, and 42 an ignition switch.

The distributor 34 is provided thereon with a pickup as being the engine rotation sensor and a signal rotor solidly secured to a distributor shaft, and, for example, a crank angle reference position signal is fed to an electronic control circuit 44 every 30 degrees of the crank angle. In consequence, an engine rotational speed can be obtained from the interval between the crank angle reference position signals and the number of the crank angle reference position signals.

Figure 3:
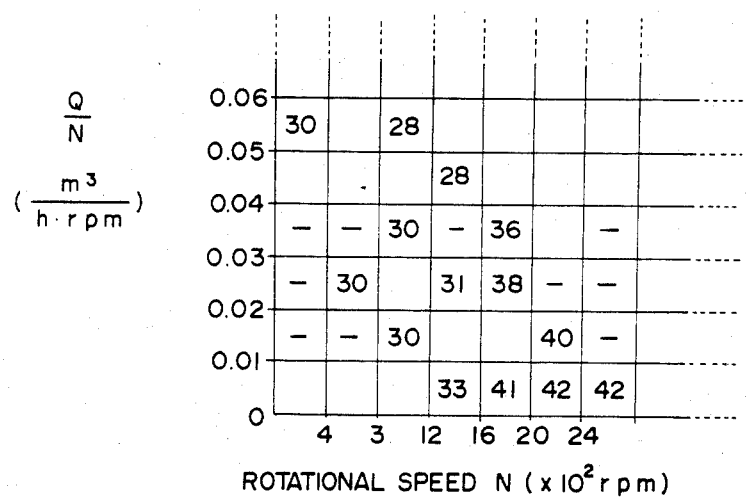
FIG. 3 is a chart showing the basic ignition advance angles determined by the rotational speed and a ratio between the intake air flow rate and the rotational speed.
Figure 2:
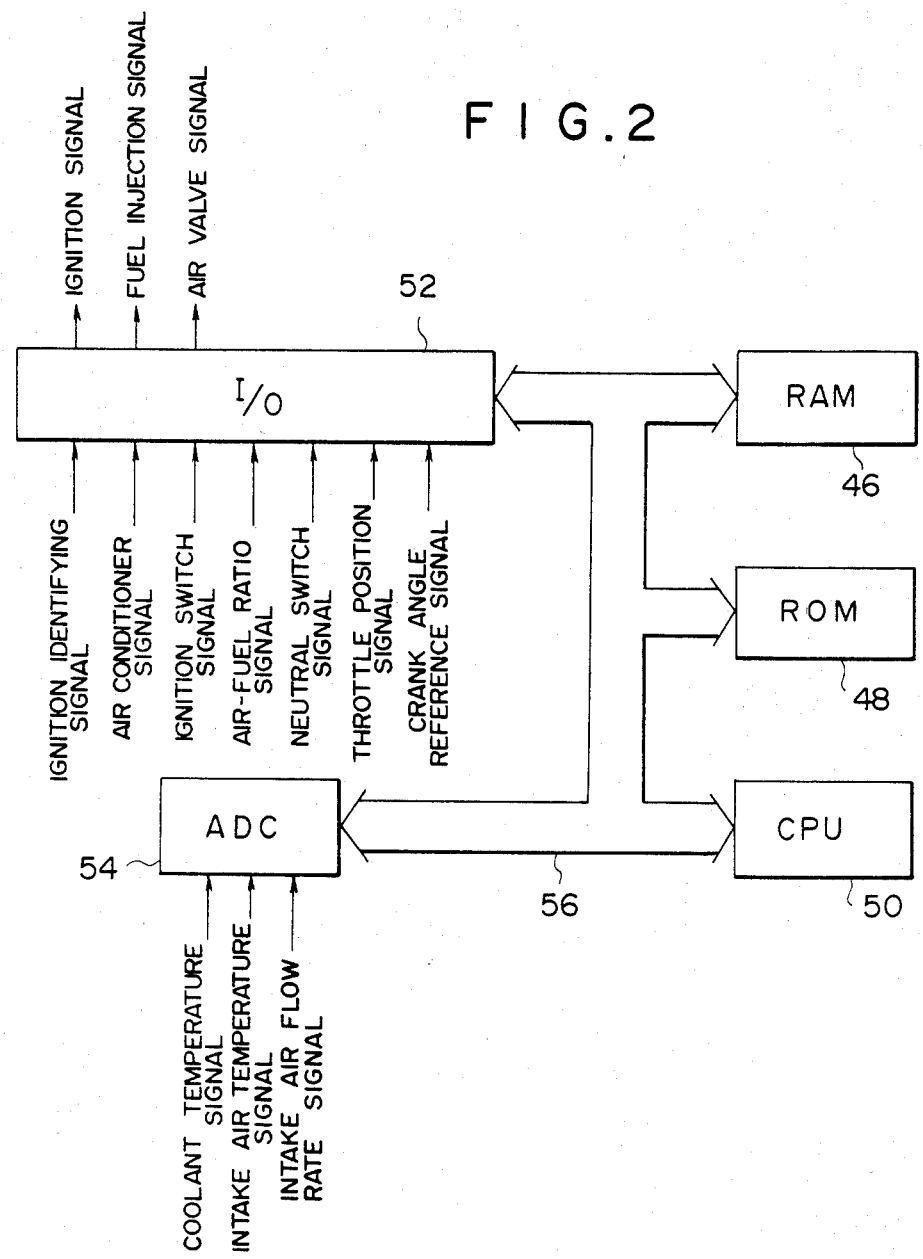
FIG. 2 is a block diagram showing an electronic control circuit in the aforesaid embodiment.

As shown in FIG. 2, the electronic control circuit 44 includes: a Random Access Memory (RAM) 46, a Read Only Memory (ROM) 48, a central processing unit (CPU) 50, an input/output circuit (I/O) 52 and an analogue/digital converter (ADC) 54, and the RAM 46, ROM 48, CPU 50, I/O 52 and ADC 54 are connected to one another through a data bus 56. The ROM 48 of the electronic control circuit 44 stores therein the engine rotational speeds N as shown in FIG. 3, a map of the basic ignition advance angles indicated by a ratio Q/N between the intake air flow rate Q and the engine rotational speed N (The figure in the map equal in unit to the crank angles (°CA) of Before Top Dead Center (BTDC), the basic injection flow rates and the like. Inputted into the I/O 52 are: a crank angle reference signal outputted from the distributor 34; a throttle position signal outputted from the throttle sensor 10; a neutral switch signal outputted from the neutral switch 40; an air conditioner signal outputted from the air conditioner, not shown; an ignition switch signal outputted from the ignition switch 42; an ignition identifying signal outputted from the igniter 36; an air-fuel ratio signal outputted from the $O_2$ sensor 29, and the like. The I/O 52 outputs an air valve signal for controlling the air valve 16, a fuel injection signal for controlling the fuel injection device 22, an ignition signal for controlling the igniter 36 and the like. Inputted to the ADC 54 are: an intake air flow rate signal outputted from the air flow meter 4; an intake air temperature signal outputted from the intake air temperature sensor 6; and a coolant temperature signal outputted from the coolant temperature sensor 30, and all of these signal are converted into digital signals by the ADC 54. Depending upon the controlled conditions of the engine, various maps may be stored in the ROM 48, and various other signals are inputted to or outputted from the I/O 52 and the ADC 54.

Figure 4:
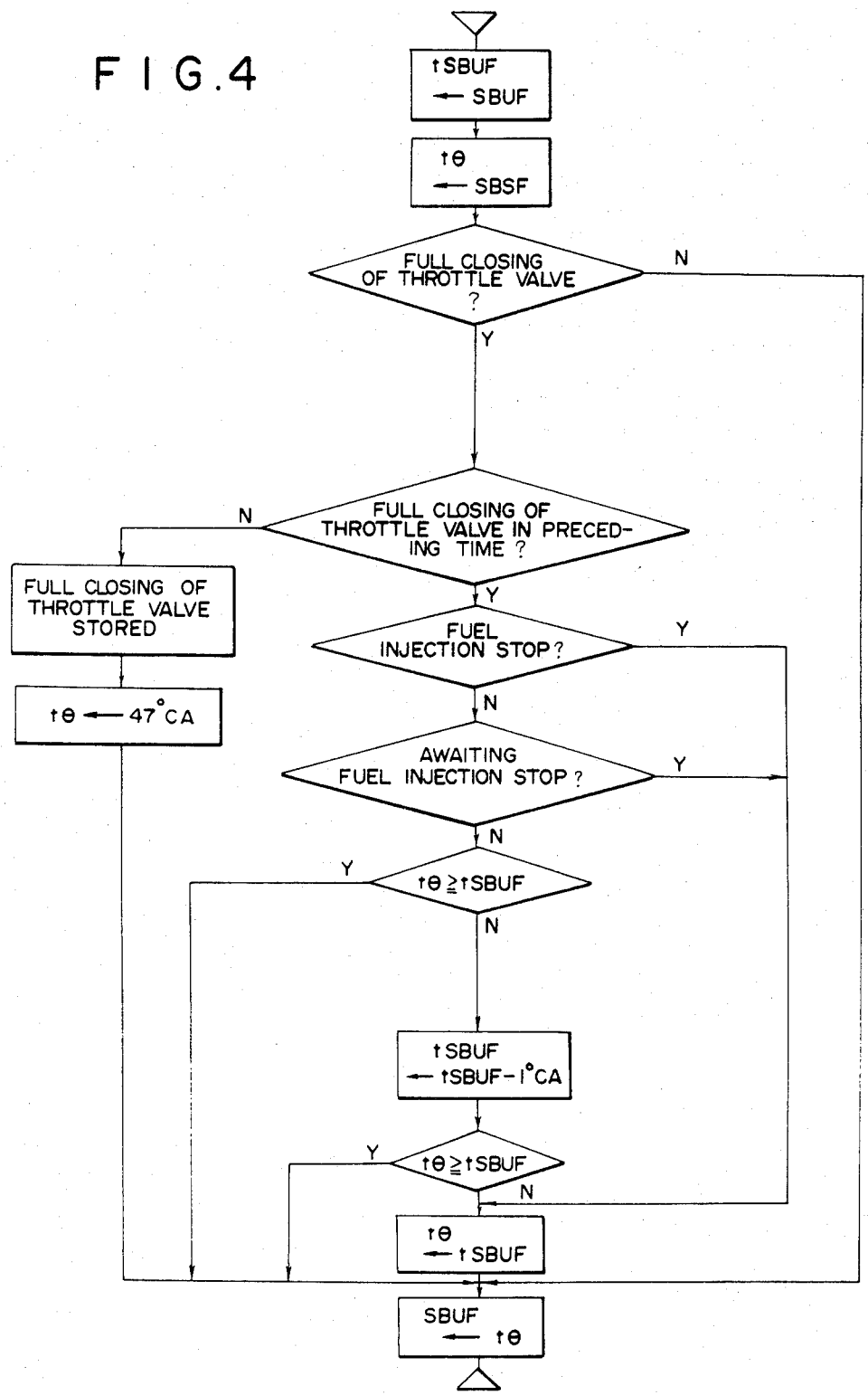
FIG. 4 is a flow sheet showing a first control by the electronic control circuit in the aforesaid embodiment.

Description will hereunder be given of the first control of the present embodiment with reference to FIG. 4. In the following, description will be given of the case of controlling the ignition timing to the maximum ignition advance angle at the time that fuel injection has stopped or during the time period just before fuel injection is to stop, which represents the first characteristic feature of the present invention, and the case of progressively controlling the ignition timing to the optimum ignition advance angle upon return to the fuel injection. However, at other times, control of the fuel injection flow rate and the intake air flow rate is made in the same manner as in the prior art, so that description thereof will be omitted. Furthermore, control shown in FIG. 4 is effected by an interruption, for example, every 30 degrees of the crank angle.

Firstly, an execution ignition advance angle SBUF, at which the igniter 36 has actually been controlled in the preceding time, is stored in a register tSBUF, and a basic ignition advance angle SBSE determined by the intake air flow rate and the engine rotational speed as shown in FIG. 3 is stored in a register $t\theta$. Subsequently, judgment is made whether a throttle valve full closing signal has been fed from the throttle sensor 10 or not. When no throttle valve full closing signal is fed, i.e., the engine is not idling, the igniter 36 is controlled to the optimum ignition advance angle, in which correction ignition advance angles are added to a basic ignition advance angle (the value in the map shown in FIG. 3), as the execution ignition advance angle SBUF.

In the subsequent interruption, in the same manner as in the preceding interruption, the execution ignition advance angle SBUF is stored in the register tSBUF, the basic ignition advance angle SBSE is stored in the register $t\theta$, and judgment is made whether the throttle valve is fully closed or not. Here, if the throttle valve is fully closed, then, in the succeeding step, judgment is made whether the throttle valve has been fully closed or not in the preceding time. When the throttle valve has not been fully closed in the preceding time, i.e., the full closing of the throttle valve is detected for the first time at present, the full closing of the throttle valve is stored in the RAM 46, and the maximum ignition advance angle (for example, BTDC47°CA) free from knockings is stored in the register $t\theta$ in place of the basic ignition advance angle SBSE. Then, the value of the register $t\theta$, i.e., BTDC47°CA is made to be the execution ignition advance angle SBUF and an ignition signal is fed to the igniter 36. In consequence, when the throttle valve is fully closed for the first time as in the course of deceleration, etc., the ignition timing is immediately controlled to BTDC47°CA.

Furthermore, in the subsequent interruption, in the same manner as in the preceding interruption, the execution ignition advance angle SBUF is stored in the register tSBUF, and the basic ignition advance angle SBSE is stored in the register $t\theta$. Here, the value of the execution ignition advance angle SBUF has been changed to BTDC47°CA in the preceding interruption. In addition, the value of the basic ignition advance angle SBSE equals to the value in the map as shown in FIG. 3 similarly to the preceding time and the time before the preceding. Subsequently, judgment is made whether the throttle valve is fully closed or not, and, when the throttle valve is fully closed, judgment is made whether the throttle valve has been fully closed in the preceding time or not. Here, when the throttle valve has been fully closed in the preceding time, i.e., the full closing of the throttle valve (the idling condition) continues, judgment is made whether the fuel injection stop contitues or not, or whether the time period for awaiting the fuel injection stop continues or not. This judgment is made on the basis of the fact that the throttle valve is fully closed and the engine rotational speed is less than a predetermined rotational speed. Here, when the fuel injection stop or the time period for awaiting the fuel injection stop continues, the value stored in the register tsBUF is shifted to the register $t\theta$. Since BTDC47°CA is stored in the register tSBUF, BTDC47°CA is stored in the register $t\theta$. Subsequently, the value (BTDC47°CA) of the register $t\theta$ is fed to the igniter 36 as being the execution ignition advance angle SBUF, whereby the igniter 36 is controlled to BTDC47°CA.

Then, in the subsequent interruption, in the same manner as in the preceding interruption, the execution ignition advance angle SBUF is stored in the register tSBUF and the basic ignition advance angle SBSE is stored in the register $t\theta$. Here, since the execution ignition advance angle SBUF in the preceding time is BTDC47°CA, BTDC47°CA is stored in the register tSBUF. In addition, the basic ignition advance angle SBSE equals to the value in the map shown in FIG. 3, similarly to the preceding time. Subsequently, judgment is made whether the full closing of the throttle valve continues or not, and, when the full closing continues, judgment is made whether the fuel injection stop or the time period for awaiting the fuel injection stop continues or not. Here, when neither fuel injection stop nor time period for awaiting the fuel injection stop continues, i.e., the fuel injection has returned, judgment is made whether the value of the register $t\theta$ exceeds the value of the register tSBUF or not. When the value of the register $t\theta$ exceeds the value of the register tSBUF, i.e., the value of the basic ignition advance angle exceeds BTDC47°CA, the value (the value in the map shown in FIG. 3) of the register $t\theta$ is made to be the execution ignition advance angle to control the igniter 36.

On the other hand, the value stored in the register tSBUF is larger than the value stored in the register $t\theta$, for example, BTDC1°CA is subtracted from the value of the register tSBUF (BTDC47°CA) and the result thus obtained is turned into the value of the register tSBUF. Thereafter, judgment is made whether the value stored in the register $t\theta$ is larger than the value stored in the register tSBUF or not, and, when the value stored in the register $t\theta$ is larger than the value stored in the register tSBUF, the igniter 36 is controlled to the basic ignition advance angle in the map shown in FIG. 3. In contrast thereto, when the value stored in the register tSBUF is larger than the value stored in the register $t\theta$, the value of the register tSBUF is shifted to the register $t\theta$, the value of the register $t\theta$ is made to be the execution ignition advance angle SBUF, i.e., the igniter 36 is controlled to the execution ignition advance angle BTDC46°CA.

In addition, in controlling the ignition timing to the value in the map shown in FIG. 3 in the above-described operation, ignition corrections are to be made by the coolant temperature signal, the air conditioner signal and the like, then simultaneous corrections are made, and, the igniter 36 is controlled to the execution ignition advance angle thus corrected. In consequence, the igniter 36 is controlled to the optimum ignition advance angle meeting the conditions of the engine.

As the control is effected as described above, the ignition timing is controlled to BTDC47°CA during the time period from the initial full closing of the throttle valve to the return to the fuel injection, and, after the return to the fuel injection, the ignition timing is controlled to the value, in which, for example, BTDC1°CA is subtracted from BTDC47°CA each time. Additionally, the value thus forcedly advanced is smaller than the basic ignition advance angle in the map, the ignition timing is controlled to the value in the map.

Description will hereunder be given of the second control of the present embodiment with reference to FIG. 5. In the following, description will principally be given of the case of controlling the ignition timing to the maximum ignition advance angle after a predetermined times of ignitions have been effected upon detection of the full closing of the throttle valve, which represents the second characteristic feature of the present invention, and the case of control of the fuel injection flow rate and the intake air flow rate by the electronic control circuit is made in the same manner as in the prior art, so that description thereof will be omitted. Furthermore, the operation shown in FIG. 5 is effected by an interruption, for example, every 30 degrees of the crank angle.

Firstly, the execution ignition advance angle SBUF, which actually controls the igniter 36, is stored in the register tSBUF, and the basic ignition advance angle SBSE meeting the engine conditions shown in FIG. 3 is stored in the register tSBUF. Subsequently, judgment is made whether a throttle valve full closing signal has been fed from the throttle sensor 10. When no throttle valve full closing signal has been fed, i.e., the engine is not in the idling condition, the igniter 36 is controlled to the basic ignition advance angle (the value in the map shown in FIG. 3) as being the execution ignition advance angle SBUF.

In the subsequent interruption, in the same manner as in the preceding interruption, the execution ignition advance angle SBUF is stored in the register tSBUF, the basic ignition advance angle SBSE is stored in the register tθ, and, when the throttle valve is fully closed, in the succeeding step, judgment is made whether a predetermined times of ignitions (for example, five ignitions) have been effected or not. In addition, the times of ignitions are counted by a counter in response to the ignition identifying signals, etc. Here, when five ignitions have been not effected, the ignition is controlled in the same manner as aforesaid, however, when five ignitions have been effected, in the succeeding step, judgment is made whether the throttle valve has been fully closed or not in the preceding time. When the throttle valve has not been fully closed in the preceding time, i.e., the full closing of the throttle valve is detected for the first time at present, the full closing of the throttle valve is stored in the RAM 46, and the maximum ignition advance angle (for example, BTDC47°CA) is stored in the register tθ in place of the basic ignition advance angle SBSE. Then, the value of the register tθ, i.e., BTDC47°CA is made to be the execution ignition advance angle SBUF and an ignition signal is fed to the igniter 36. In consequence, when the throttle valve is fully closed for the first time as in the course of deceleration, the ignition timing is controlled to BTDC47°CA immediately after the predetermined times of ignitions have been effected.

Furthermore, in the subsequent interruption, in the same manner as in the preceding interruption, the execution ignition advance angle SBUF is stored in the register tSBUF and the basic ignition advance angle SBSE is stored in the register tθ. Here, the value of the execution ignition advance angle SBUF has been changed to BTDC47°CA in the preceding interruption. In addition, the value of the basic ignition advance angle SBUF equals to the value in the map shown in FIG. 3 similarly to the preceding time and the time before the preceding. Subsequently, judgment is made whether the throttle valve is fully closed or not, and, when the throttle valve is fully closed, further judgment is made whether five ignitions have been effected or not, and whether the throttle valve has been fully closed or not in the preceding time. Here, when five times of ignitions have been effected and the throttle valve has been fully closed in the preceding time, i.e., the full closing of the throttle valve (the idling condition) continues and five times of ignitions have been effected, judgment is made whether the fuel injection stop continues or not, and the time period for awaiting the fuel injection stop continues or not. Here, when the fuel injection stop continues or the time period for awaiting the fuel injection stop continues, the valve stored in the register SBUF is shifted to the register tθ. Since BTDC47°CA is stored in the register tSBUF, the register tθ stores BTDC47°CA. Subsequently, the value of the register tθ (BTDC47°CA) is fed to the igniter 36 as being the execution ignition advance angle SBUF, whereby the igniter is controlled to BTDC47°CA.

Then, in the succeeding interruption, in the same manner as in the preceding interruption, the execution ignition advance angle SBUF is stored in the register tSBUF, and the basic ignition advance angle SBSE is stored in the register tθ. Here, since the execution ignition advance angle SBUF in the preceding time is BTDC47°CA, the register tSBUF stores BTDC47°CA. In addition, the basic ignition advance angle SBSE equals to the value in the map shown in FIG. 3 similarly to the preceding time. Subsequently, judgment is made whether the full closing of the throttle valve continues or not and whether five times of ignitions have been effected or not, and, when the full closing continues, judgment is made whether the fuel injection stop continues or not, and whether the time period for awaiting the fuel injection stop continues or not. Here, in the case other than the fuel injection stop and the time period for awaiting the fuel injection stop, i.e., when the fuel injection has returned judgment is made whether the value of the register tθ exceeds the value of the register tSBUF or not. Here, when the value of the register tθ exceeds the value of the register tSBUF, i.e., the value of the basic ignition advance angle exceeds BTDC47°CA, the igniter 36 is controlled to the value of the register tθ (the value in the map shown in FIG. 3) as being the execution ignition advance angle.

On the other hand, when the value stored in the register tSBUF is larger than the value stored in the register tθ, judgement is made whether the engine rotational speed N exceeds a predetermined value (for example, 1,000 rpm) or not. Here, when the engine rotational speed N exceeds 1,000 rpm, BTDC1°CA is subtracted from the value of the register tSBUF (BTDC47°CA) and the result thus obtained is turned into the value of the register tSBUF. Thereafter, judgment is made whether the value stored in the register tθ exceeds the value stored in the register tSBUF or not, and, when the value stored in the register tθ exceeds the value stored in the register tSBUF, the igniter 36 is controlled to the basic ignition advance angle in the map shown in FIG. 3. In contrast thereto, when the value stored in the register tSBUF exceeds the value stored in the regisger tθ, the value of the register tSBUF is shifted to the register tθ, the value of the register tθ is made to be the execution advance angle SBUF, i.e., BTDC46°CA is made to be the execution advance angle, to which the igniter 36 is controlled.

In contrast thereto, when the engine rotational speed N is less than 1,000 rpm, BTDC5°CA is subtracted from the value (BTDC47°CA) of the register tSBUF and the result thus obtained is turned into the value of the register tSBUF. Thereafter, judgment is made whether the value stored in the register tθ exceeds the value stored in the register tSBUF or not, and, when the value stored in the register tθ exceeds the value stored in the register tSBUF, the igniter 36 is controlled to the basic ignition advance angle in the map shown in FIG. 3. Furthermore, when the value stored in the register tSBUF is larger than the value stored in the register tθ, the value of the register tSBUF is shifted to the register tθ, the value of the register tθ is made to be the execution ignition advance angle SBUF, i.e., the igniter 36 is controlled to the execution ignition advance angle BTDC42°CA.

In addition, in controlling the ignition timing to the value in the map shown in FIG. 3 in the above-described operation, ignition corrections are to be made by the coolant temperature signal, the air conditioner signal and the like, then simultaneous corrections are made, and the igniter 36 is controlled to the execution ignition advance angle thus corrected.

As the control is effected as described above, the ignition timing is controlled to BTDC47°CA during the time period from the initial full closing of the throttle valve and the subsequent five ignitions to the return of the fuel injection, and, after the return of the fuel injection, the ignition timing is controlled to the value, in which BTDC1 or 5°CA is subtracted from BTDC47°CA commensurate to the engine rotational speed N. Additionally, the value thus forcedly advanced is smaller than the basic ignition advance angle required in the map, the ignition timing is controlled to the value in the map. Furthermore, the reason why the rate of approaching the basic ignition advance angle from the value thus forcedly advanced is made larger when the engine rotational speed is less than the predetermined value is that the engine rotational speed should be quickly decreased to the idling condition.

From the foregoing description, it should be apparent to one skilled in the art that the above-described embodiment is but one of many possible specific embodiments which can represent the applications of the principles of the present invention. Numerous and varied other arrangements can be readily devised by those skilled in the art without departing from the spirit and scope of the invention.

What is claimed is:

1. An electronic engine control system with a fuel injector and an igniter for controlling the ignition timing of an engine, comprising:

throttle valve opening detecting means for detecting the opening of a throttle valve of the engine and outputting a throttle position signal; and control means for outputting a signal to control the ignition timing to a maximum ignition advance angle when the full closing of said throttle valve is indicated by said throttle position signal, said maximum ignition advance angle being a fixed and predetermined timing determined in accordance with the particular engine used, but more advanced than the most advanced ignition timing which can occur within said particular engine when said throttle valve has not fully closed.

2. An electronic engine control system of an engine as set forth in claim 1, wherein:

said system further comprises fuel injection stop means for generating a fuel injection stop signal when fuel injection has stopped and just before fuel injection is to stop; and said control means outputs a signal for controlling the ignition timing to the maximum ignition advance angle when continuance of the full closing of the throttle valve is indicated by said throttle position signal and said fuel injection stop signal is outputted.

3. An electronic engine control system as set forth in claim 2, wherein:

said system further comprises intake air flow rate detecting means for detecting engine intake air flow rate at the upstream side of said throttle valve and outputting an intake air flow rate signal, and enging rotational speed detecting means for detecting a rotational speed of the engine and outputting an enging rotational speed signal; and said control means outputs control signals including a signal to control the ignition timing to an optimum ignition advance angle for said particular engine, which is always less advanced than said maximum ignition advance angle, on the basis of said intake air flow rate signal and said engine rotational speed signal when the full closing of the throttle valve is not indicated by said throttle position signal.

4. An electronic engine control system as set forth in claim 3, wherein said control means outputs a signal to control the ignition timing to the optimum ignition advance angle on the basis of said basic ignition advance angle when continuance of the full closing of said throttle valve is indicated by said throttle position signal, said fuel injection stop signal is not outputted, and the basic ignition advance angle determined in accordance with said intake air flow rate signal and said engine rotational speed signal exceeds in value the maximum ignition advance angle.

5. An electronic engine control system as set forth in claim 3, said control means outputs control signals including a signal to control the ignition timing to the optimum ignition advance angle on the basis of an ignition advance angle smaller in value than said maximum ignition advance angle when said basic ignition advance angle is smaller in value than said maximum ignition advance angle.

6. An electronic engine control system with a fuel injector and an igniter for controlling the ignition timing of an engine, comprising:

throttle valve opening detecting means for detecting the opening of a throttle valve of the engine and outputting a throttle position signal;

intake air flow rate detecting means for detecting intake air flow rate of the engine at the upstream side of said throttle valve and outputting an intake air flow rate signal;

engine rotational speed detecting means for detecting a rotational speed of the engine and outputting an engine rotational speed signal;

fuel injection stop detecting means for detecting when fuel injection has stopped and just before fuel injection is to stop and outputting a fuel injection stop signal; and control means for controlling said ignition timing to an optimum ignition advance angle determined for the particular engine used in accordance with said intake air flow rate signal and said engine rotational speed signal when the full closing of the throttle valve is not indicated by said throttle position signal, controlling the ignition timing to a maximum ignition advance angle when said fuel injection stop signal is outputted after the full closing of the throttle valve has been indicated by said throttle position signal, said maximum ignition advance angle being a fixed and predetermined timing determined in accordance with said particular engine used, but more advanced than any possible value of said optimum ignition advance angle for said particular engine, and outputting control signals including a signal to progressively control the ignition timing to the optimum ignition advance angle when said fuel injection stop signal is not outputted after the ignition timing has been controlled to the maximum ignition advance timing.

7. An electronic engine control system with a fuel injector and an igniter for controlling the ignition timing of an engine, comprising:

throttle valve opening detecting means for detecting the opening of a throttle valve of the engine and outputting a throttle position signal;

ignition time detecting means for detecting the number of ignitions of the engine and outputting an ignition time signal; and control means for outputting control signals including a signal to control the ignition timing to a maximum ignition advance angle when said ignition time signal indicates that a predetermined number of ignitions have occurred afer the detection of the full closing of the throttle valve by said throttle position signal, said maximum ignition advance angle being a fixed and predetermined timing determined in accordance with the particular engine used, but more advanced than the most advanced ignition timing which can occur within said particular engine when said throttle valve has not fully closed.

8. An electronic engine control system as set forth in claim 7, wherein:

said system further comprises intake aif flow rate detecting means for detecting intake air flow rate of the engine at the upstream side of said throttle valve and outputting an intake air flow rate signal, engine rotational speed detecting means for detecting an engine rotation speed and outputting an engine rotational speed signal, and fuel injection stop means for outputting a fuel injection stop signal when said fuel injection has stopped and just before fuel injection is to stop; and said control means outputs control signals including a signal to control the ignition timing to an optimum ignition advance angle for said particular engine, substantially less advanced than said maximum ignition advance angle, on the basis of a basic ignition advance angle determined in accordance with said intake air flow rate signal and said engine rotational speed signal when the full closing of the throttle valve is not indicated by said throttle position signal and said ignition time signal detects that a predetermined number of ignitions have occurred.

9. An electronic engine control system as set forth in claim 8, wherein said control means outputs a signal for controlling the ignition timing to the maximum ignition advance angle when continuance of the full closing of the throttle valve is indicated by said throttle position signal, said ignition time signal detects that a predetermined number of ignitions have occurred, and a fuel injection stop signal is outputted.

10. An electronic engine control system as set forth in claim 8, wherein said control means outputs control signals including a signal to control the ignition timing to the optimum ignition advance angle on the basis of said basic ignition advance angle when continuance of the full closing of the throttle valve is indicated by said throttle position signal, said ignition time signal indicates that a predetermined number of ignitions have occurred after said throttle valve has become fully closed, said fuel injection stop signal is not outputted and a basic ignition advance angle determined in accordance with said intake air flow rate signal and said engine rotational speed signal exceeds the value of said maximum ignition advance angle.

11. An electronic engine control system as set forth in claim 8, wherein said control means obtains a subtracted ignition advance angle by subtracting a predetermined ignition angle from said maximum ignition advance angle when continuance of the full closing of the throttle valve is indicated by said throttle position signal, said ignition time signal indicates that a predetermined number of ignitions have occurred after said throttle valve has become fully closed, said fuel injection stop signal is not outputted, a basic ignition advance angle determined in accordance with said intake air flow rate signal and said engine rotational speed signal is smaller than said maximum ignition advance angle and outputs control signals including a signal to control the ignition timing to the maximum ignition advance angle on the basis of said basic ignition advance angle when said basic ignition advance angle exceeds said subtracted ignition advance angle.

12. An electronic engine control system as set forth in claim 11, wherein said control means outputs control signals including a signal to control the ignition timing to said subtracted ignition advance angle when said basic ignition advance angle is smaller in value than said subtracted ignition advance angle.

13. An electronic engine system as set forth in claim 8, wherein said control means controls the ignition timing to the maximum ignition advance angle when said ignition time signal indicates that a predetermined number of ignitions have occurred after the indication of the full closing of the throttle valve by said throttle position signal and said fuel injection stop signal is outputted, and outputs control signals including a progressive control signal to progressively control the ignition timing to the optimum ignition advance angle commensurate to an engine rotational speed detected by said engine rotational speed signal when said fuel injection stop signal is not outputted.

14. An electronic engine control system with a fuel injector and an igniter for controlling the ignition timing of an engine, comprising:
- throttle valve opening detecting means for detecting the opening of a throttle valve of an engine and outputting a throttle position signal;
- intake air flow rate detecting means for detecting intake air flow rate at the upstream side of said throttle valve and outputting an intake air flow rate signal;
- engine rotational speed detecting means for detecting an engine rotational speed and outputting an engine rotational speed signal;
- ignition time detecting means for detecting the number of ignitions of the engine and outputting an ignition time signal;
- fuel injection stop detecting means for detecting when fuel injection has stopped and just before fuel injection is to stop and outputting a fuel injection stop signal; and
- control means for controlling said ignition timing to an optimum ignition advance angle determined for the particular engine used in accordance with said intake air flow rate signal and said engine rotational speed signal when the full closing of the throttle valve is not indicated by said throttle position signal, controlling the ignition timing to a maximum ignition advance angle when said fuel injection stop signal is outputted after the full closing of the throttle valve is indicated by said throttle position signal, said maximum ignition advance angle being a fixed and predetermined timing determined in accordance with said particular engine used, but more advanced than any possible value of said optimum ignition advance angle for said particular engine, and said fuel injection stop signal is outputted after said ignition time signal has detected that a predetermined number of ignitions have occurred after said throttle valve has become fully closed, and outputting control signals including a signal to progressively control the ignition timing to the optimum ignition advance angle when said fuel injection stop signal is not outputted after the ignition timing has been controlled to the maximum ignition advance angle.

* * * * *